United States Patent
Foley

(10) Patent No.: US 10,956,199 B2
(45) Date of Patent: Mar. 23, 2021

(54) REMOTE VIRTUAL MACHINE CONSOLE ACCESS WITH PERSISTENT AND SEAMLESS CLIENT CONNECTIONS DURING VIRTUAL MACHINE MIGRATION

(71) Applicant: International Business Machines Corporation, Armonk, NY (US)

(72) Inventor: Sean Christopher Foley, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 16/353,009

(22) Filed: Mar. 14, 2019

(65) Prior Publication Data

US 2020/0293351 A1  Sep. 17, 2020

(51) Int. Cl.
G06F 9/451 (2018.01)
G06F 9/455 (2018.01)
H04L 29/08 (2006.01)

(52) U.S. Cl.
CPC .......... *G06F 9/45558* (2013.01); *H04L 67/28* (2013.01); *G06F 2009/4557* (2013.01); *G06F 2009/45595* (2013.01)

(58) Field of Classification Search
CPC .. G06F 2009/4557; G06F 9/452; G06F 9/455; G06F 9/45558; G06F 9/4856; G06F 2009/45595; H04L 67/28
See application file for complete search history.

(56) References Cited

U.S. PATENT DOCUMENTS

| 8,756,602 B2 | 6/2014 | Narayanasamy | |
|---|---|---|---|
| 2011/0004680 A1* | 1/2011 | Ryman | H04L 67/14 709/224 |
| 2013/0198744 A1* | 8/2013 | Zimmerman | G06F 9/45558 718/1 |
| 2015/0234672 A1* | 8/2015 | Ajiro | G06F 11/30 718/1 |
| 2015/0254092 A1 | 9/2015 | Chandrasekaran | |
| 2015/0256446 A1* | 9/2015 | Doi | H04L 45/14 709/203 |
| 2015/0295751 A1 | 10/2015 | Caison et al. | |
| 2015/0324215 A1 | 11/2015 | Borthakur | |

OTHER PUBLICATIONS

Foley, Sean C., "Remote Virtual Machine Console Access With Persistent and Seamless Client Connections During Virtual Machine Migration", U.S. Appl. No. 16/502,071, filed Jul. 3, 2019, 22 pages.
Appendix P—List of IBM Patents or Patent Applications Treated as Related, Filed herewith, 2 Pages.

(Continued)

*Primary Examiner* — Dong U Kim
(74) *Attorney, Agent, or Firm* — David B. Woycechowsky

(57) ABSTRACT

A system of computers in network communication where: (i) an end user's computer accesses an instantiation of a virtual machine using remote console software; (ii) the access to the VM is performed through a proxy server; and (iii) by using the proxy server, when the VM instantiation is moved from one physical host computer to another physical host computer, there is no substantial interruption in the access of the VM by the end user through the remote console software.

12 Claims, 4 Drawing Sheets

(56) References Cited

OTHER PUBLICATIONS

"Live Migration", Wikipedia, This page was last edited on Feb. 16, 2019, at 11:18 (UTC), <https://en.wikipedia.org/wiki/Live_migration>, 4 pages.

"Managing Virtual Machines in VMWare Cloud on AWS", VMWare, Inc., Dec. 10, 2018, 168 pages.

"Network Visualization Tool Using 3D Visual Diagrams to Describe Virtual Network Functions", An IP.com Prior Art Database Technical Disclosure, Authors et. al: Disclosed Anonymously, IP.com No. IPCOM000248148D, IP.com Electronic Publication Date: Nov. 1, 2016, 21 pages.

"Supporting Migration of Virtual Machines That Depend on Network Layer 2 Communications With Other Network Nodes in a Computing Cloud", An IP.com Prior Art Database Technical Disclosure, Authors et. al.: Disclosed Anonymously, IP.com No. IPCOM000198973D, IP.com Electronic Publication Date: Aug. 19, 2010, 6 pages.

"System and Method to Provide Mobile Application Virtualization in Cloud Paradigm", An IP.com Prior Art Database Technical Disclosure, Authors et. al.: Disclosed Anonymously, IP.com No. IPCOM000223777D, IP.com Electronic Publication Date: Nov. 29, 2012, 6 pages.

"VMWare Infrastructure Architecture Overview", White Paper, VMWare, © 2006 VMWare, Inc. 14 pages.

\* cited by examiner

REMOTE VIRTUAL MACHINE CONSOLE ACCESS WITH PERSISTENT AND SEAMLESS CLIENT CONNECTIONS DURING VIRTUAL MACHINE MIGRATION

BACKGROUND

The present invention relates generally to the field of virtual machine live migration (that is, moving a set of virtual machines (VMs) from one set of physical host computer(s) to another set of physical host computers while the virtual machines are running. The physical locations and devices of the VMs may change during migration because of the change from one set or host computer(s) to another, but the logical locations of the VMs in the system relative to each other may stay intact, depending upon the specifics of a given VM migration.

Remote consoles for use with VMs are known. For example, one type of VM remote console is called VMware Remote Console. VMware Remote Console to connects remotely to a virtual machine's mouse, keyboard, and screen, which allows a user to use them as if the user had the guest operating system installed on the user's local computer. VMware Remote Console is a browser plug-in that you can be used with various popular web browser programs. VMware Remote Console opens in a separate window. The user can keep VMware Remote Console running even if the user closes her browser. The user can open more than one console to interact with the operating systems of several virtual machines at the same time.

In conventional computer systems where a VM is used by a remote end user, virtual machine hypervisors support live migration, which allows the virtual machine host to move guests to another physical computer while the virtual machine is running. Users of the virtual machine are unaware that the virtual machine has moved. If the target hardware must have similar characteristics as the original hardware (disks, CPUs, memory, network, etc.), then live migration can occur without users of the virtual machine being aware. This is especially useful in cloud environments when host operating systems need to be patched with security fixes, or when hardware needs to be replaced or upgraded. Virtual machines can be migrated to new hardware so that users of those virtual machines are not disrupted during such procedures.

The technology of virtual machine consoles will now be discussed. Note that all elements intrinsic to the virtual machine are migrated, and that includes the virtual machines IP address and network interfaces. However, there are elements to virtual machines that are not "internal" to the virtual machines but are accessible from the hypervisor that is providing and managing those virtual machines. The hypervisor exists as part of the software on the virtual machine host, and thus network access is done through the host network. In cloud environments, the host network is typically accessible to the vendor only, for operation and maintenance purposes, and for operation of the control plane that manages the cloud.

Hypervisor consoles will now be discussed. Hypervisors allow system designers to provision one or more consoles for a virtual machine. The console is available through the hypervisor. There can be a serial console (textual), or there can be graphical consoles which use protocols like VNC/RFB (virtual network computing/remote frame buffer) or RDP (remote desktop protocol) to provision remote access to any kind of console, whether a text console, a windows system like XWindows or MS Windows, or any other type of desktop. As previously mentioned, the console is therefore accessible through the hypervisor's network. When live migration occurs, the console does not migrate with the VM, instead the old one is closed, and a new console server is available for connection with the new hypervisor. During live migration, the VM moves from the hypervisor running on one machine to the hypervisor that is running on another, and hence access to the VM through the hypervisor must change.

Known alternatives to using the hypervisor-provided consoles will now be discussed. It is possible to maintain console connections to a VM through the VM itself. For instance, using a VNC server in the guest operating system can support VNC connections.

SUMMARY

According to an aspect of the present invention, there is a method, computer program product and/or system for use with an end user computer, a first physical host computer and a second physical host computer, that performs the following operations (not necessarily in the following order): (i) setting up, by a proxy server (for example, a proxy computer), remote console access by remote console software of the end user computer through the proxy computer and to a first instantiation of a first virtual machine running on the first physical host computer; and (ii) responsive to live migration of the first instantiation of the first virtual machine running on the first physical host computer to a second instantiation of the first virtual machine running on the second physical host computer, switching remote console access by the remote console software of the end user computer through the proxy computer from the first instantiation to the second instantiation. The switch from first instantiation to second instantiation causes no substantial interruption to remote console access by the end user, appearing to the console user as a single uninterrupted connection.

DETAILED DESCRIPTION

Figure 1:
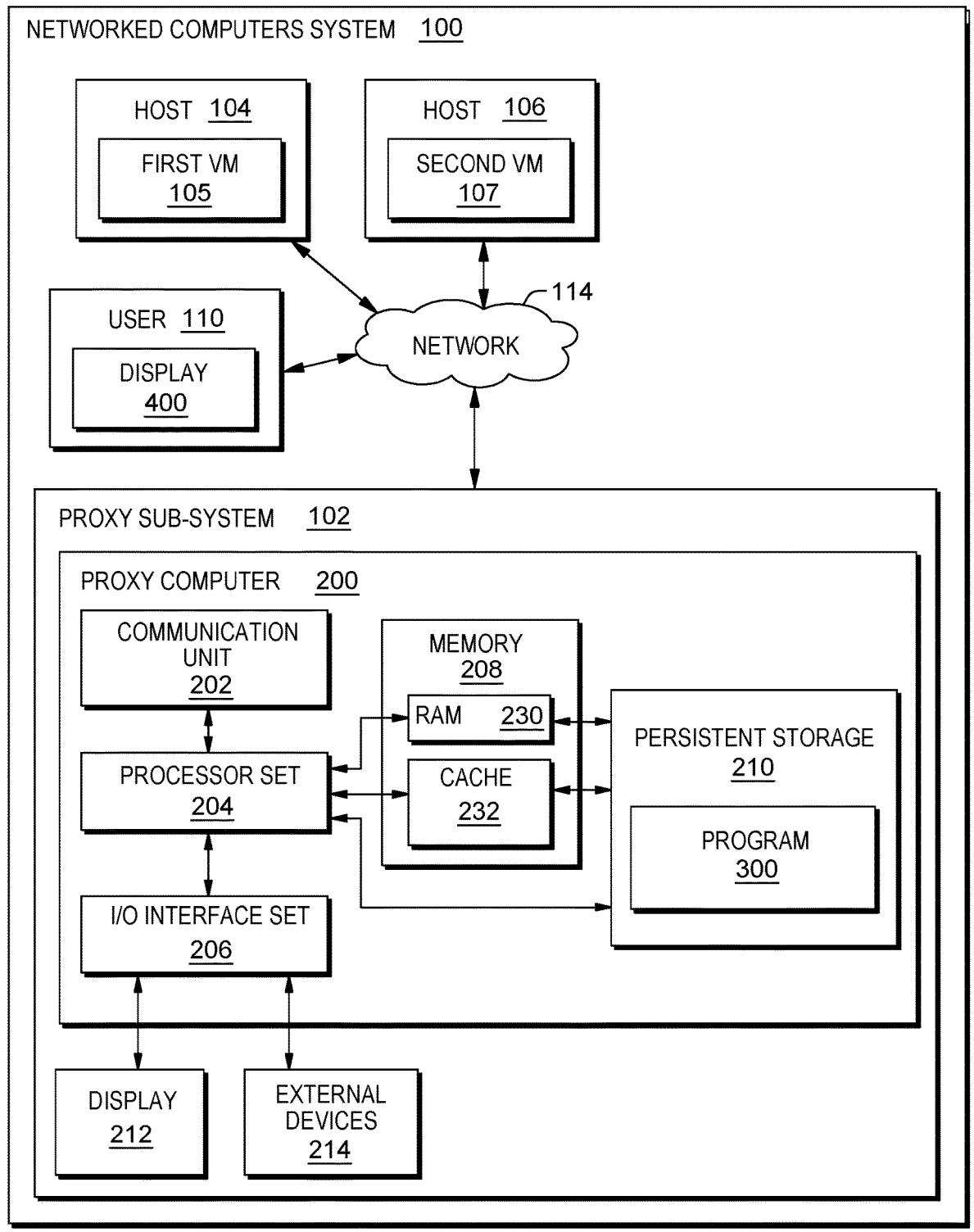
FIG. 1 is a block diagram view of a first embodiment of a system according to the present invention.

Some embodiments of the present invention are directed to a system of computers in network communication where: (i) an end user's computer accesses an instantiation of a virtual machine using remote console software; (ii) the access to the VM is performed through a proxy server running on a proxy computer; and (iii) by using the proxy server, when the VM instantiation is moved from one physical host computer to another physical host computer, there is no substantial interruption in the access of the VM by the end user through the remote console software. This Detailed Description section is divided into the following sub-sections: (i) The Hardware and Software Environment;

(ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: proxy sub-system 102; first physical host computer 104 (including first instantiation of first VM 105); second physical host computer 106 (including second instantiation of first VM 107); end user computer 110 (including display 400 and remote console access software (not separately shown in FIG. 1); and communication network 114. Sub-system 102 includes: proxy computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
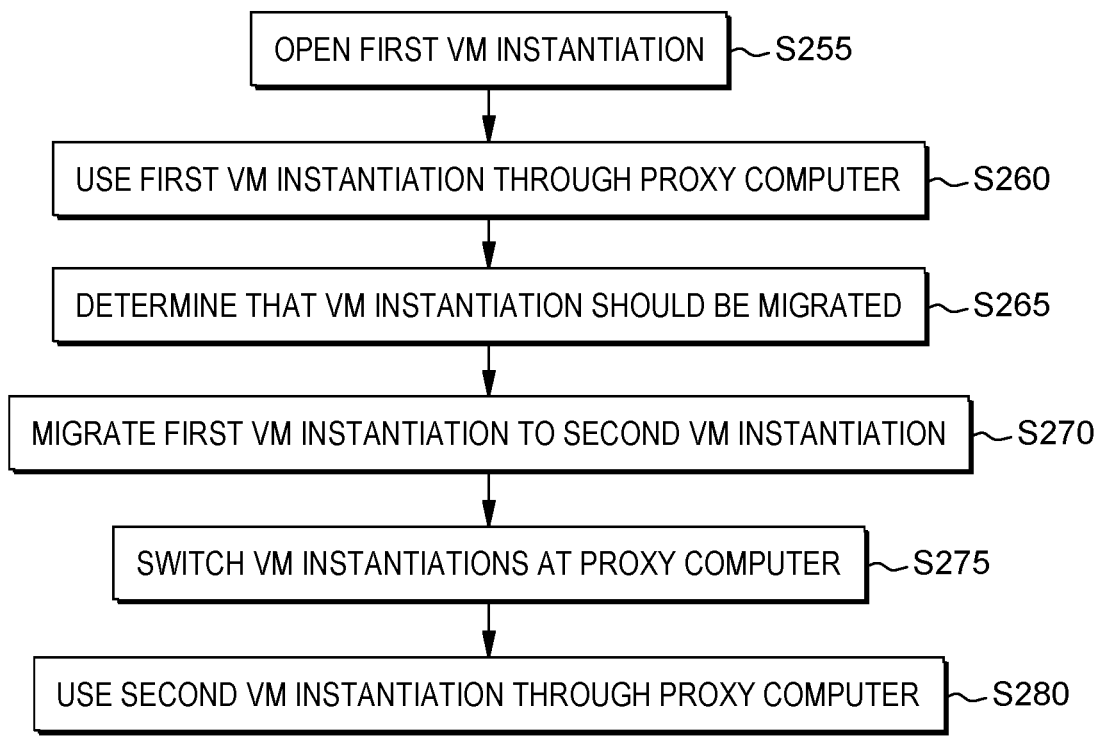
FIG. 2 is a flowchart showing a first embodiment method performed, at least in part, by the first embodiment system.
Figure 3:
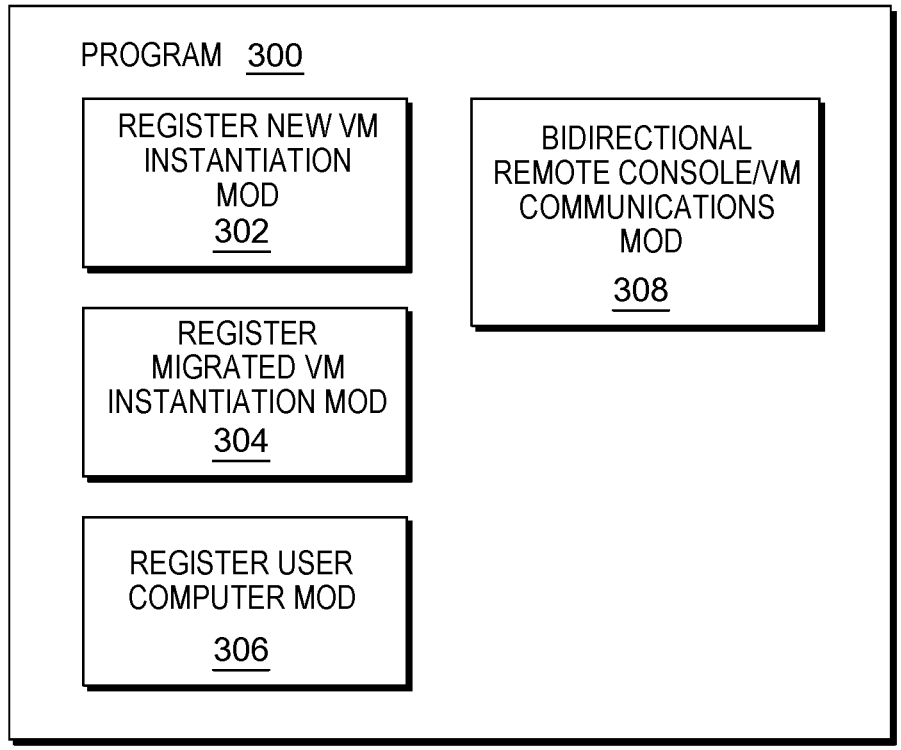
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where register connection to new VM instantiation module ("mod") 302 connects to the instantiation of the first VM 105 that is running on first physical host computer 104 (see FIG. 1) through the proxy server. This means that mod 302 sets up bidirectional data communication paths between first physical host computer 104 and remote console access software of end user computer 110 (which is registered with the proxy server by register user computer mod 306). Some examples of possible types of bidirectional communication paths that can be used in various embodiments of the present invention are discussed in detail in the next sub-section of this Detailed Description section. At the time of operation S255, the second instantiation of first VM 107 does not yet exist.

Figure 4:
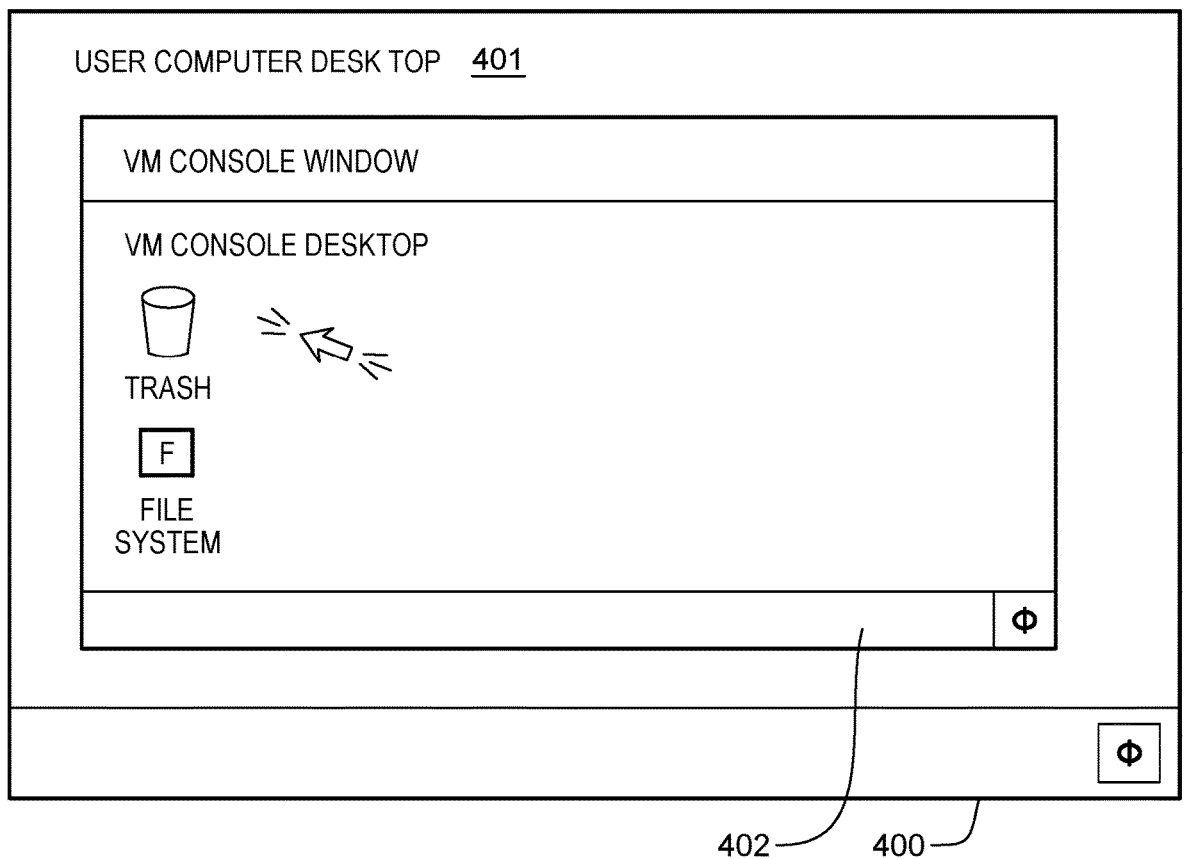
FIG. 4 is a screenshot view generated by the first embodiment system.

Processing proceeds to operation S260, where end user computer 110 uses the first instantiation of the first VM 105, with bidirectional communications therebetween passing through server on proxy computer 200 under control of bidirectional remote console/VM communications mod 308. FIG. 4 shows display 400, where the first instantiation of the first VM appears on window 402 which appears within user computer desktop 401. The end user uses the first instantiation remotely through this interface. In this embodiment, the user is not made aware of the proxy, or its role in passing along bidirectional communications.

Processing proceeds to operation S265, where it is determined that first instantiation of first VM on physical host computer 104 should be migrated to a new instantiation running on physical host computer 106. As those of skill in the art will understand, there are many reasons why a VM instantiation may be migrated. In this embodiment, the decision to migrate and the choice of computer 106 as a target machine is made by components not shown in FIG. 1.

Processing proceeds to operation S270, where first instantiation of first VM 105 is migrated to second instantiation of first VM 107 running on physical host computer 106 (see FIG. 1). FIG. 1 shows a brief moment in time when both instantiations exist during the migration. It is during this brief moment in time when operation S275 is performed, where register migrated VM instantiation mod 304 registers the second instantiation and switches end user computer 110 from communicating with first instantiation 105 to communicating with second instantiation 107. Importantly, in this embodiment, the end user experiences no substantial interruption and would not even realize that a live VM migration had taken place with respect to the VM instantiation that she is remotely using (see FIG. 4 at window 402).

Processing proceeds to operation S280, where end user computer 110 now communicates with only the second instantiation of the first VM 107, with bidirectional communications therebetween passing through server on proxy computer 200 under control of bidirectional remote console/VM communications mod 308. In other words, the VM instantiation switch has occurred and the proxy continues to pass along communications between the instantiation and the end user's remote console access software, as there may be further migrations of the VM instantiation that the end user is continuously, persistently and seamlessly using.

III. Further Comments and/or Embodiments

With respect to known alternatives to using the hypervisor-provided consoles, some embodiments of the present invention recognize the following facts, potential problems and/or potential areas for improvement: (i) require configuration by VM owner, both the server itself and the networking; (ii) require additional configuration to make it secure; (iii) not available until O/S (operating system) has booted; and (iv) not necessarily as reachable when the instance is under duress or crashed, network misconfigured, memory or storage constrained, etc.

Some embodiments of the present invention may include one, or more, of the following features, characteristics, operations and/or advantages: (i) provides a method for maintaining a persistent console connection to a VM throughout the process of live VM migration, including graphical console connections such as VNC or RDP; (ii) includes a proxy server that forwards traffic bidirectionally in both directions, to/from the console client and the console server of the virtual machine's hypervisor; (iii) the proxy server enables connections to occur in different ways, either by websocket for browser connections, by SSH for encrypted tunnel connections, or direct TCP connections; (iv) the proxy server keeps connections to the client alive at all times; and/or (v) connections to the VM can be disrupted by migration, at which point the proxy server reconnects to the VM at its new IP address and then links the new server connection to the old client connection.

Some embodiments of the present invention may include one, or more, of the following features, characteristics, operations and/or advantages: (i) from the user, or customer's, perspective, they will be unaware that a migration of the VM has taken place; (ii) when a VM migrates, the back-end connection from the proxy server to the hypervisor VNC server will be broken, while the front-end connection from the proxy server to the customer client will remain open throughout (another way of saying this is to say that the client connection is persistent and seamless across the VM migration); (iii) the proxy server, when detecting the broken server connection, will query the control plane for the new location of the VM, and will attempt reconnection; (iv) the proxy server will attempt reconnection to the VNC server until it succeeds; (v) each time reconnection fails, it will query for the location again to ensure it is always using the most recent known location for the VM; (vi) once a reconnection succeeds, it will link the existing connection to the customer VNC client with the new connection to the VM VNC server; (vii) from the customer's perspective, they will be unable to detect that a migration of the VM has taken place, all of this will happen in less than a second and no customer input to the VM (mouse clicks, key presses) will be lost; and/or (viii) there will be no indication in the customer's VNC client that the migration occurred.

Figure 5:
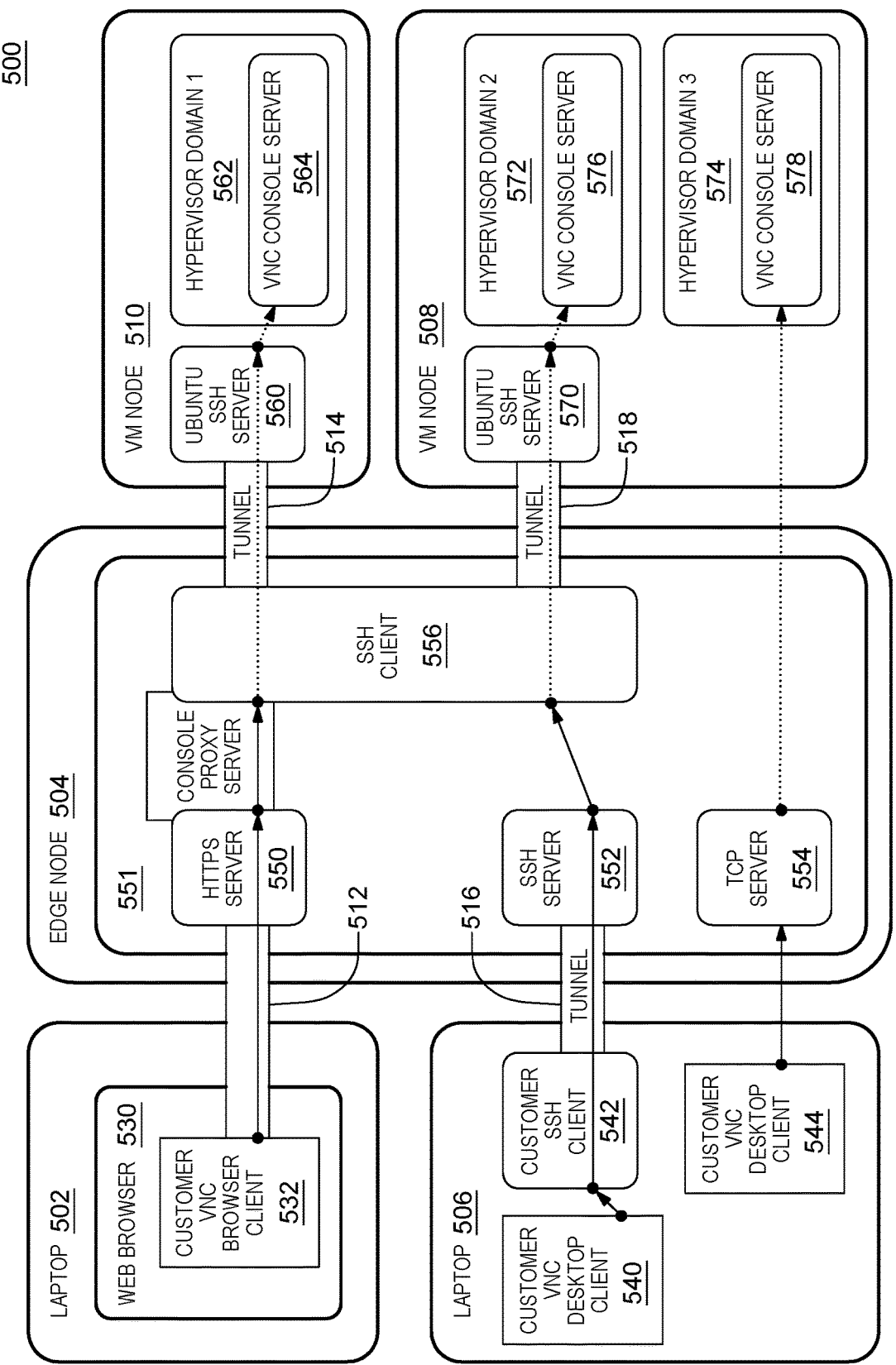
FIG. 5 is a block diagram view of a second embodiment of a system according to the present invention.

FIG. 5 shows Proxy Server system 500 with Websocket, SSH (secure shell) and TCP (transmission control protocol) data communication connections. System 500 provides remote virtual machine console access with persistent and seamless client connections during virtual machine live migration. System 500 includes: laptop 502 (also sometimes herein referred to as first customer computer 502); edge node 504; laptop 506 (also called second customer computer 506); first VM node 510; second VM node 508; data communication connection 512; tunnel 514; tunneling data communication connection 516; and tunneling data communication connection 518. Edge node 504, first VM node 510 and second VM node 508 are herein referred to as "nodes"

rather than "computers" because the physical host machines that actually run the machine logic of these respective nodes may change over time. First customer computer 502 includes web browser 530, which includes customer VNC (virtual network computing) browser client 532. Second customer computer 506 includes: customer VNC browser client 540; customer SSH client 542; and customer VNC desktop client 544. Edge node 504 includes console proxy server 551, which includes: HTTPS (Hyper Text Transfer Protocol Secure) server 550; SSH server 552; TCP server 554; and SSH client 556. First VM node 510 includes Ubuntu SSH server 560; and first hypervisor domain 562 (including VNC console server 564). Second VM node 508 includes Ubuntu SSH server 570; second hypervisor domain 572 (including VNC console server 576); and third hypervisor domain 574 (including VNC console server 578). A re-established server connection, that is made after VM migration, is depicted in dotted lines in FIG. 5.

A method performed by system 500 will now be set forth as follows: (i) the proxy server is ferrying traffic to/from the user's client to the hypervisor console server for the VM; (ii) proxy server detects connection to VNC server is closed; (iii) the proxy server does a lookup to determine the new location of the virtual machine, which consists of the host IP address for the new hypervisor hosting the VM, and the TCP port to be used to connect; (iv) proxy server connects to VNC server port (potentially with a secure tunnel); (v) proxy server completes handshake with the VNC server; (vi) proxy server links the connection to the customer VNC client with the connection to the VM VNC server; and (vii) the proxy server continues ferrying traffic to/from the user's client to the hypervisor console server for the VM.

Additional considerations to make seamless live migration work will now be discussed. The traffic being sent back and forth primarily consists of messages. The logical sequence of messages as well as message structure must be maintained during migration. VNC graphical desktop sharing and its RFB client-server protocol is now considered to illustrate the additional requirements for this invention to work, as will be discussed in the following paragraphs.

REPEAT HANDSHAKE: To allow reconnection to a VM's VNC proxy server, the VNC proxy server must record the initial login sequence when the client originally connected, so it must be able to parse the VNC protocol traffic for the login sequence and repeat it after a VM has been migrated to a separate node. This permits the VNC connection to be re-established seamlessly and linked with the customer's client, while from the customer's perspective no disruption has occurred (depending on performance, the customer might notice a lag while the live migration takes place and the connection re-established).

RFB MESSAGE PARSING: For live migration to be successful, it is required that the protocol remain intact across the migration from one VNC server connection to another. Any partial messages received from the server, any RFB messages not fully received from the VNC server when the connection is closed, cannot be delivered to the client. Therefore, the proxy server parses the traffic and forwards any RFB message to a VNC client only when the full message has been received.

Similarly, the proxy server must ensure that messages received from the client are sent to either the previous VNC server connection of the new VNC server connection, but not split between the two, and not sent to both (which would duplicate clicks and key presses). For this reason, incoming client messages must be sent to the server only when the full message has been received. If any part of a message fails to be sent to the previous server connection, the full message will be forwarded to the new connection. For the above reasons, the RFB protocol messages must be parsed by the proxy parser to the extent required to determine the end of each message.

SUPPORTED RFB ENCODINGS: When the proxy server is message parsing, only those RFB protocol encodings known by the proxy server can be used for the parsing to succeed. So, upon the initial client-server connection, the proxy server filters out the list of supported encodings provided by the client to exclude any unknown encodings.

RFB ENCODING CHANGES: Certain RFB framebuffer encodings are not stateless, namely those encodings that make use of zlib streams. The streams are considered continuous over the lifetime of the session, and hence, when reconnecting, decompression of the streams can fail. Two encodings make use of zlib streams: tight and zrle. The tight encoding contains a provision as part of the encoding to "reset" the streams. The zrle encoding provides no such provision. If the client successfully supports the "reset" provision of the tight protocol, then the tight encoding can be used when reconnecting, but otherwise, the VNC server must be informed that the tight encoding is not supported when the new connection is established. In all cases, the VNC server must be informed that the zrle encoding is not supported when the new connection is established. Supported encoding negotiation is part of the handshake, and so it is not problematic to change the supported encodings after live migration has taken place.

Some embodiments of the present invention may include one, or more, of the following features, characteristics, operations and/or advantages: (i) console access is continuous during live migration of VMs and (ii) console access that is never closed and has no downtime.

A method according to an embodiment of the present invention includes the following operations (not necessarily in the following order): (i) using a proxy server to bidirectionally communicate between: (a) a first running virtual machine instance, and (b) a set of client device(s) using the first running virtual machine instance; (ii) replacing the first running virtual machine instance to a second virtual machine instance; and (iii) using the proxy server to bidirectionally communicate between: (a) the second running virtual machine instance, and (b) the set of client device(s) that now use the second running virtual machine instance. In this embodiment, the replacement is performed so that there is substantially no time passage between: the set of client(s) last use of the first running virtual machine instance, and the set of client(s) initial use of the second running virtual machine instance.

Some embodiments of the present invention may include one, or more, of the following features, characteristics, operations and/or advantages: (i) provides for console connections continuously while a VM is migrated with no downtime; (ii) provides access to the console while not providing access to any aspect of the underlying hardware; (iii) the proxy server is maintaining a connection from a VNC client on the one side and a virtual machine on the other side, acting as a middleman passing the traffic bidirectionally; (iv) from the client's perspective the middleman is not visible and to the client it appears to the client that there is a single end-to-end connection from the client to the migratory VM; (v) the proxy server acts as an invisible middleman, so in fact the end-to-end connection from client to VM is actually two connections, from client to proxy server and from proxy server to VM (these two connections appear as a single connection from the client perspective;

(vi) the first VM instance is duplicated by a second VM instance that is a copy of the first, the second can exist on separate computer hardware, with the intent being that the second VM will replace the first; and/or (vii) the back-end proxy server to VM connection is redirected from the first virtual machine instance to the second, wherein the live migration is performed so that there is substantially no perceptible time passage between: (a) the client(s) last use of the first running virtual machine instance, and (b) the client(s) initial use of the second running virtual machine instance.

Some embodiments of the present invention may include one, or more, of the following features, characteristics, operations and/or advantages: (i) the proxy server manages the transition from one back-end connection to the other in such a way as it appears to be (from the front-end perspective) a single connection from the front end client to a single VM on the back-end; (ii) to accomplish this, amongst other things, the handshake with the second VM is managed only by the proxy server and not by the VNC client, while network packets to/from either VM are filtered so that no packets are interrupted, duplicated, or omitted in the client's bidirectional communication with both VMs; and/or (iii) the result being that the VNC client connection to the proxy server appears (from the client perspective) as a continuous and uninterrupted end-to-end connection from the VNC client to just a single VM.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product (CPP) for use with an end user computer, a first physical host computer and a second physical host computer, the CPP comprising:
   a storage medium; and
   computer code stored on the storage medium, with the computer code including data and instructions for causing a processor(s) set to perform at least the following operations:
      setting up, by a proxy server, remote console access by remote console software of the end user computer through the proxy server and to a first instantiation of a first virtual machine running on the first physical host computer, and
      responsive to live migration of the first instantiation of the first virtual machine running on the first physical host computer to a second instantiation of the first virtual machine running on the second physical host computer, switching, by the proxy server, remote console access by the remote console software of the end user computer through the proxy server from the first instantiation to the second instantiation, with the switching including the following:
         detecting a broken server connection to the first instantiation of the first virtual machine,
         during the detection of the broken server connection, querying a control plane for a location of the second instantiation of the first virtual machine, and
         connecting, in data communication, the proxy server and the second instantiation of the first virtual machine.

2. The CPP of claim 1 wherein:
   the end user computer includes a virtual network computing type graphical desktop-sharing client;
   a virtual network computing type graphical desktop-sharing server in the guest operating system can support virtual network computing type graphical desktop-sharing connections; and
   the switching of remote console access by the remote console software of the end user computer switches a bi-directional data communication from occurring over a first path between the virtual network computing type graphical desktop-sharing client and a virtual network computing type graphical desktop-sharing server that administers the first instantiation, which first path passes through the proxy server, to occurring over a second path between the virtual network computing type graphical desktop-sharing client and a virtual network computing type graphical desktop-sharing server that administers the second instantiation, which second path passes through the proxy server.

3. The CPP of claim 1 wherein the switch from the first instantiation to the second instantiation is persistent.

4. The CPP of claim 1 wherein:
the setting up of remote console access by the remote console software of the end user computer through the proxy server and to the first instantiation includes setting up at least one tunneling type data communication path between the end user computer and the first physical host computer; and
the switching of remote console access by the remote console software of the end user computer through the proxy server from the first instantiation to the second instantiation includes setting up at least one tunneling type data communication path between the end user computer and the second physical host computer.

5. The CPP of claim 1 wherein:
the switching from the first instantiation to the second instantiation includes handshaking between the remote console software of the end user computer and the second instantiation running on the second physical host computer, with the handshaking being managed only by the proxy server.

6. The CPP of claim 1 further comprising:
filtering, by the proxy server, network packets to/from the first and second instantiations so that no packets are interrupted, duplicated, or omitted in the remote console's bidirectional communication with the first and second instantiations.

7. A proxy server (PS) for use with an end user computer, a first physical host computer and a second physical host computer, the PS comprising:
a processor(s) set;
a storage medium; and
computer code stored on the storage medium, with the computer code including data and instructions for causing the processor(s) set to perform at least the following operations:
  setting up remote console access by remote console software of the end user computer through the proxy server and to a first instantiation of a first virtual machine running on the first physical host computer, and
  responsive to live migration of the first instantiation of the first virtual machine running on the first physical host computer to a second instantiation of the first virtual machine running on the second physical host computer, switching, by the proxy server, remote console access by the remote console software of the end user computer through the proxy server from the first instantiation to the second instantiation, with the switching including the following:
    detecting a broken server connection to the first instantiation of the first virtual machine,
    during the detection of the broken server connection, querying a control plane for a location of the second instantiation of the first virtual machine, and
    connecting, in data communication, the proxy server and the second instantiation of the first virtual machine.

8. The PS of claim 7 wherein:
the end user computer includes a virtual network computing type graphical desktop-sharing client;
a virtual network computing type graphical desktop-sharing server in the guest operating system can support virtual network computing type graphical desktop-sharing connections; and
the switching of remote console access by the remote console software of the end user computer switches a bi-directional data communication from occurring over a first path between the virtual network computing type graphical desktop-sharing client and a virtual network computing type graphical desktop-sharing server that administers the first instantiation, which first path passes through the proxy server, to occurring over a second path between the virtual network computing type graphical desktop-sharing client and a virtual network computing type graphical desktop-sharing server that administers the second instantiation, which second path passes through the proxy server.

9. The PS of claim 7 wherein the switch from the first instantiation to the second instantiation is persistent.

10. The PS of claim 7 wherein:
the setting up of remote console access by the remote console software of the end user computer through the proxy server and to the first instantiation includes setting up at least one tunneling type data communication path between the end user computer and the first physical host computer; and
the switching of remote console access by the remote console software of the end user computer through the proxy server from the first instantiation to the second instantiation includes setting up at least one tunneling type data communication path between the end user computer and the second physical host computer.

11. The PS of claim 7 wherein:
the switching from the first instantiation to the second instantiation includes handshaking between the remote console software of the end user computer and the second instantiation running on the second physical host computer, with the handshaking being managed only by the proxy server.

12. The PS of claim 7 further comprising:
filtering, by the proxy server, network packets to/from the first and second instantiations so that no packets are interrupted, duplicated, or omitted in the remote console's bidirectional communication with the first and second instantiations.

* * * * *